C. F. PRATT.
WEED CUTTING ATTACHMENT.
APPLICATION FILED JAN. 12, 1920.
1,383,483. Patented July 5, 1921.
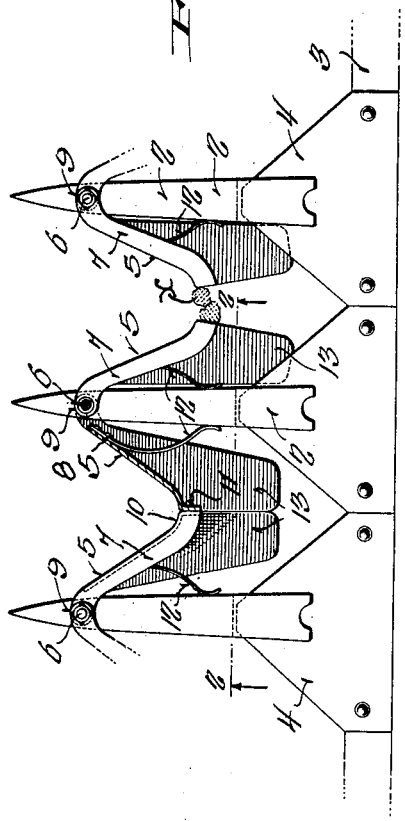
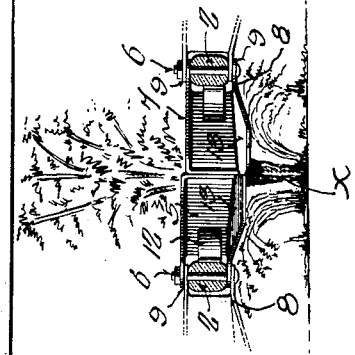
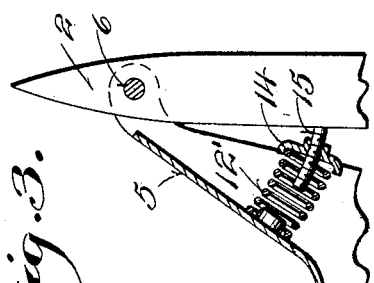

UNITED STATES PATENT OFFICE.

CHARLES F. PRATT, OF PLYMOUTH, WISCONSIN.

WEED-CUTTING ATTACHMENT.

1,383,483.  Specification of Letters Patent.  Patented July 5, 1921.

Application filed January 12, 1920. Serial No. 350,921.

*To all whom it may concern:*

Be it known that I, CHARLES F. PRATT, a citizen of the United States, and resident of Plymouth, in the county of Sheboygan and State of Wisconsin, have invented certain new and useful Improvements in Weed-Cutting Attachments; and I do hereby declare that the following is a full, clear, and exact description thereof.

My invention has particular application to weed destroying machinery and is adapted to be mounted upon any standard harvester or mower cutter bar so that the machine may be run over a field of young grain in order to cut the weeds, and particularly the thistles, without danger of cutting or mutilating the former. In other words the invention is in the form of a guard for preventing normal access to the cutter bar, the attachments being rendered inoperative, however, when the stalk of a thistle or other weed having considerable resistance is engaged.

With this general object in view, the invention consists in the novel features of construction, combination and arrangement of parts which will be hereinafter more particularly described and claimed and shown in the drawing in which—

Figure 1 represents a plan view, partly in section, of a portion of a standard cutter of a mower or the like having my invention applied thereto, and Fig. 2 is a sectional view taken substantially on the plane of the line 2—2 of Fig. 1.

Fig. 3 illustrates a modified form of spring guard wherein the tension of the spring is capable of adjustment.

The standard cutter with which my invention is adapted to be used includes a relatively stationary cutter bar 1 having a plurality of forwardly projecting spaced and parallel guard fingers 2, and a reciprocative blade bar 3 carrying a plurality of knives 4, the same coöperating upon reciprocation of the bar 3 with the ledger plates of the guard fingers as is customary.

The invention primarily consists in providing a guard for directing small and tender grain beneath the blades 4 so as to prevent cutting thereof, while permitting weeds and the like having heavier stalks to be engaged and cut by said blades. In its preferred embodiment, therefore, the invention comprises a pair of arms 5 pivoted to each of the fingers 2 by means of a transverse bolt 6 which extends through the latter adjacent its outer end. One of these arms is disposed on each side of each finger 2 thus positioning two of the arms between each pair of fingers. Each of the arms is preferably formed of a channeled member having upper and lower flanges 7 and 8 respectively, the outer ends of these flanges providing pivot ears 9 which straddle the fingers 2 and receive the bolts 6. As shown in Fig. 2 the ears 9 are overlapped to form a compact structure.

These guard arms 5 between each pair of fingers 2 are directed inwardly toward each other and their inner adjacent end portions are curved as at 10 whereby to provide a substantially U-shaped throat between each pair of fingers. Furthermore the portions of the arms between the flanges 7 and 8 and at their inner ends are provided with abutting portions 11. A leaf spring 12 fixed to each of the arms 5 and engaged with the adjacent fingers 2 hold the pairs of arms between each pair of the latter against inward movement, or in other words urge the abutting portions 11 of each pair of arms into contact.

The lower flanges of each of the arms 5 are extended rearwardly and toward the blades 4 to provide aprons 13, the inner adjacent edges of each coöperating pair being engaged as shown in Fig. 1 when the abutment portions 11 are in contact. Thus the two aprons of each pair of guard members formed by the same and the arms 5, being below the plane of the blades 4, effectively direct the tender grain beneath the latter. In other words these aprons cover a considerable portion of the space immediately in advance of the blades 4, not only when the co-acting arms 5 are in engagement, but when the same have yielded apart to permit weed stalks or the like X to pass therebetween.

In operation, the machine having the cutter and my invention carried thereby is moved in any suitable manner over a grain field in which the grain is short, but in which the weeds, such as thistles, have grown to a considerable size. As hereinbefore mentioned the guards between each pair of fingers 2 will effectively prevent the grain from being cut by the blades 4, because the tension of the abutting springs 12 is such as to hold the coöperating pairs of arms 5 together against the pressure of the young grain. As soon, however, as a relatively rigid weed stalk is encountered, it will be directed by the fingers 2 and the U-shaped throat formed therebetween to the inner ends of one of the pairs of guard arms 5, which arms will be moved apart as indicated in Fig. 1. The weed stalk will retain the arms 5 and the aprons 13 spaced apart until it is nearly ready to be cut by one of the blades 4. This action is repeated as each weed stalk is encountered.

This arrangement provides a very effective and simple manner of removing thistles and other weeds from grain fields when the grain is small, and various means may be employed for carrying out the objects of the invention, such as by modifying and associating in a different manner, the ideas expressed by the illustrations of the accompanying drawing and description thereof set forth above.

Fig. 3 illustrates a guard arm 5 provided with a coil spring 12′, the inner end of which is nested in a nut 14, which nut is in threaded union with a pin 15 that projects from the body of the guard finger 2. By this arrangement a delicate adjustment of the springs is effected whereby the guards may be opened under more or less resistance.

I claim:

1. The combination with a cutter including a pair of forwardly projecting fingers, and a blade movable therebetween, of guard arms yieldably mounted across the space between said fingers and deflecting means extending rearwardly from the arm toward and below said blade, whereby to direct materials away from the blade.

2. The combination with a cutter including a pair of forwardly projecting fingers, and a blade movable therebetween, of a guard arm yieldably mounted across the space between said fingers and spaced from the blade, and an apron extending rearwardly from the arm and toward said blade, said apron being below the blade whereby to direct materials therebeneath.

3. The combination with a cutter including a pair of forwardly projecting fingers and a blade movable therebetween, of a guard arm pivoted to one of said fingers and projecting across the space between said fingers, said arm being yieldable inwardly toward said blade and normally spaced therefrom, and an apron extending rearwardly from the arm and toward said blade, said apron being below the blade whereby to direct materials therebeneath.

4. The combination with a cutter including a pair of forwardly projecting fingers, and a blade movable therebetween, of a guard arm formed of a channeled member yieldably disposed across the space between said fingers, the channeled member straddling one of said fingers and being pivoted thereto, and a rearwardly extending guard apron carried by one of the flanges of the channeled member to direct articles beneath said blade.

In testimony that I claim the foregoing I have hereunto set my hand at Plymouth, in the county of Sheboygan and State of Wisconsin.

CHARLES F. PRATT.